(12) United States Patent
Yaphe et al.

(10) Patent No.: US 9,441,933 B2
(45) Date of Patent: *Sep. 13, 2016

(54) METHOD AND APPARATUS FOR OUTLINING RECESSED INSTALLATION OF A COMPONENT WITHIN A SURFACE MATERIAL

(71) Applicant: Axis Lighting Inc., Lasalle (CA)

(72) Inventors: Howard Yaphe, Saint Laurent (CA); Christianne Leblanc, Montreal (CA); Sebastien Bire, Montreal (CA); Andrew Miles, Cornwall (CA); Pascal Lanoue, Montreal (CA)

(73) Assignee: Axis Lighting Inc., Lasalle (CA)

( * ) Notice: Subject to any disclaimer, the term of this patent is extended or adjusted under 35 U.S.C. 154(b) by 121 days.

This patent is subject to a terminal disclaimer.

(21) Appl. No.: 14/184,504

(22) Filed: Feb. 19, 2014

(65) Prior Publication Data

US 2014/0237836 A1    Aug. 28, 2014

Related U.S. Application Data

(63) Continuation-in-part of application No. 13/763,320, filed on Feb. 8, 2013, now Pat. No. 9,140,435.

(30) Foreign Application Priority Data

May 10, 2013   (CA) ...................................... 2815622

(51) Int. Cl.
*G01B 3/14*       (2006.01)
*F21V 21/00*      (2006.01)
(Continued)

(52) U.S. Cl.
CPC ............. *G01B 3/14* (2013.01); *E04F 21/0076* (2013.01); *F21V 21/00* (2013.01); *F21V 21/048* (2013.01); *Y10T 29/49895* (2015.01)

(58) Field of Classification Search
CPC .................................. G01B 5/14; E04F 21/00
USPC .................................................... 33/528, 566
See application file for complete search history.

(56) References Cited

U.S. PATENT DOCUMENTS 2,545,119 A    3/1951   Stratton et al.
3,919,542 A    11/1975  Castic (Continued)

FOREIGN PATENT DOCUMENTS

WO    WO 2012/156859    11/2012

OTHER PUBLICATIONS

Winona Lighting catalog "decorative Full Circle", http://www.hokproductdesign.com/myos/my-uploads/2011/07/21/full-circle-brochure.pdf, Jul. 21, 2011.

*Primary Examiner* — Yaritza Guadalupe-McCall
(74) *Attorney, Agent, or Firm* — Weaver Austin Villeneuve & Sampson LLP

(57) ABSTRACT

Described are various embodiments of a method and apparatus for outlining recessed installation of a component within a surface material. In one embodiment, the apparatus generally comprises two or more template or alignment modules adjacently disposable against the surface material and each comprising opposed edges that can be aligned with adjacently disposed edges so to define a substantially continuous spacing along these adjacently disposed edges. This spacing is generally dimensioned so to accommodate a corresponding component dimension such that, the aligned edges guide removal of surface material along the spacing to accommodate recessed installation of the component within the surface material.

31 Claims, 13 Drawing Sheets

(51) Int. Cl.
*F21V 21/04* (2006.01)
*E04F 21/00* (2006.01)

(56) References Cited

U.S. PATENT DOCUMENTS

| | | |
|---|---|---|
| 4,138,716 A | 2/1979 | Muhlethaler et al. |
| 4,410,931 A | 10/1983 | DeCandia et al. |
| 5,119,282 A | 6/1992 | Meyer et al. |
| 5,245,518 A | 9/1993 | Aspenwall |
| 5,448,460 A | 9/1995 | Belfer et al. |
| 5,452,187 A | 9/1995 | Belfer et al. |
| 5,574,600 A | 11/1996 | Agro |
| 5,583,583 A | 12/1996 | Wilson |
| 5,609,414 A | 3/1997 | Caluori |
| 6,152,573 A | 11/2000 | Mitchell |
| 6,220,317 B1 | 4/2001 | Martin et al. |
| 6,267,491 B1 | 7/2001 | Parrigin |
| 6,421,904 B1 | 7/2002 | Wedekind et al. |
| 6,698,103 B2 | 3/2004 | Nortier et al. |
| 6,702,453 B2 | 3/2004 | Weedon |
| 6,926,477 B2 | 8/2005 | Allemann et al. |
| 7,086,171 B2 | 8/2006 | Lawson |
| 7,114,826 B1 | 10/2006 | Lilly |
| 7,293,895 B2 | 11/2007 | Grossman et al. |
| 7,363,720 B2 | 4/2008 | DiGavero et al. |
| 7,497,025 B2 | 3/2009 | Murray |
| 7,611,269 B1 | 11/2009 | Lyons |
| 8,118,455 B2 | 2/2012 | Cowan et al. |
| 9,140,435 B2 * | 9/2015 | Yaphe .................... F21V 21/00 33/566 |
| 2003/0115767 A1 | 6/2003 | Wedekind et al. |
| 2005/0217129 A1 | 10/2005 | Boys |
| 2006/0098307 A1 | 5/2006 | Campean |
| 2006/0164844 A1 | 7/2006 | To |
| 2011/0297971 A1 | 12/2011 | Shimizu et al. |
| 2012/0051050 A1 | 3/2012 | Lee et al. |
| 2012/0257383 A1 | 10/2012 | Zhang |
| 2012/0287628 A1 | 11/2012 | Markell |
| 2014/0223753 A1 | 8/2014 | Yaphe et al. |
| 2014/0226327 A1 | 8/2014 | Yaphe et al. |
| 2014/0233229 A1 | 8/2014 | Yaphe et al. |
| 2014/0237836 A1 | 8/2014 | Yaphe et al. |

* cited by examiner

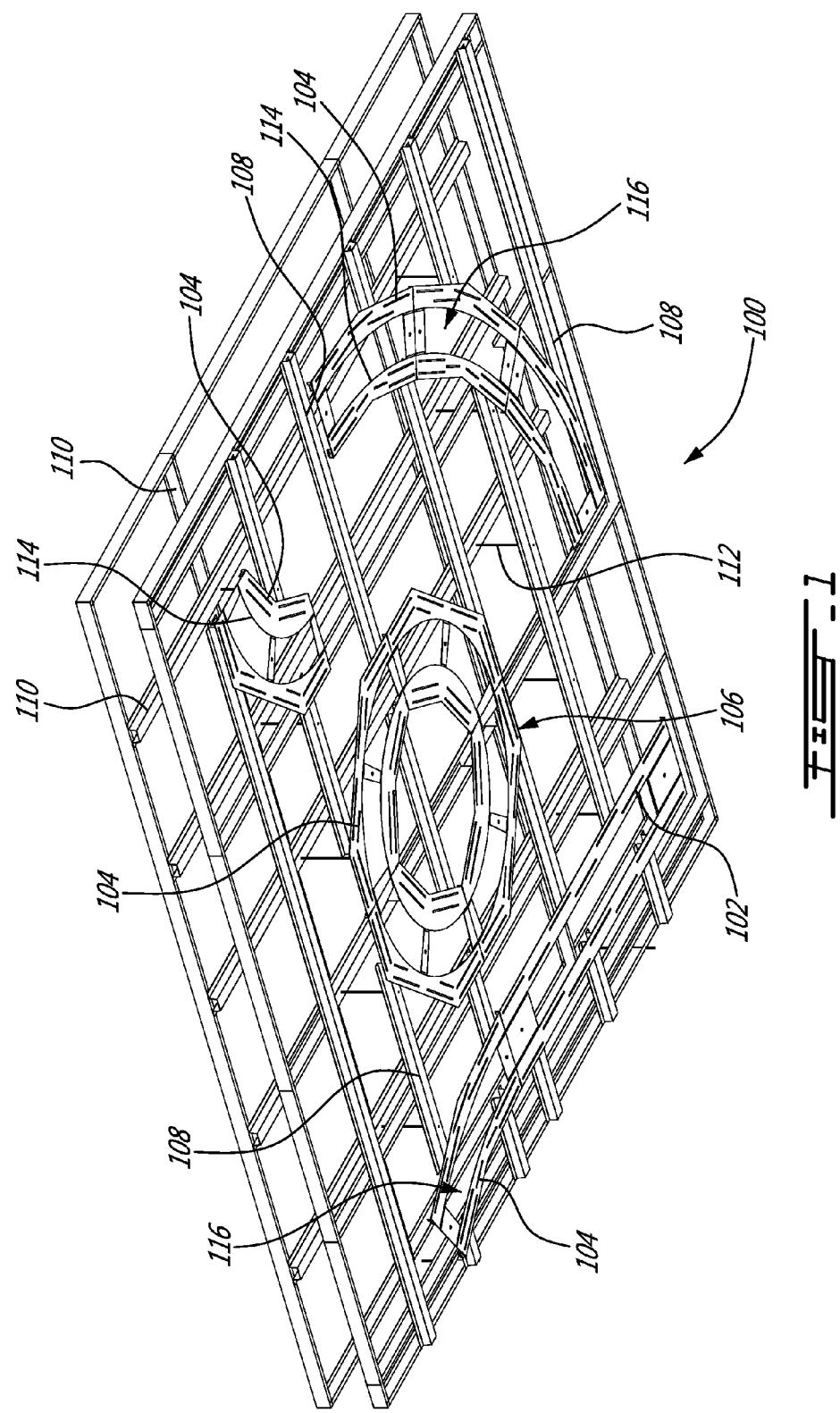

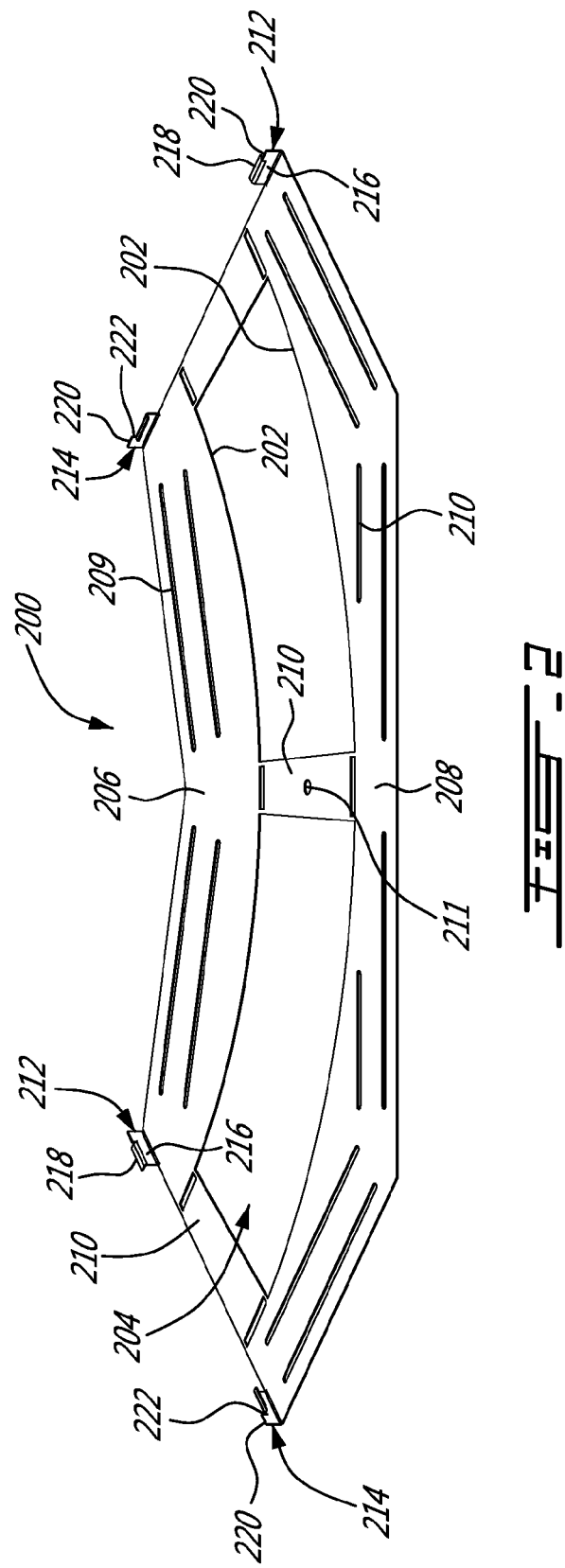

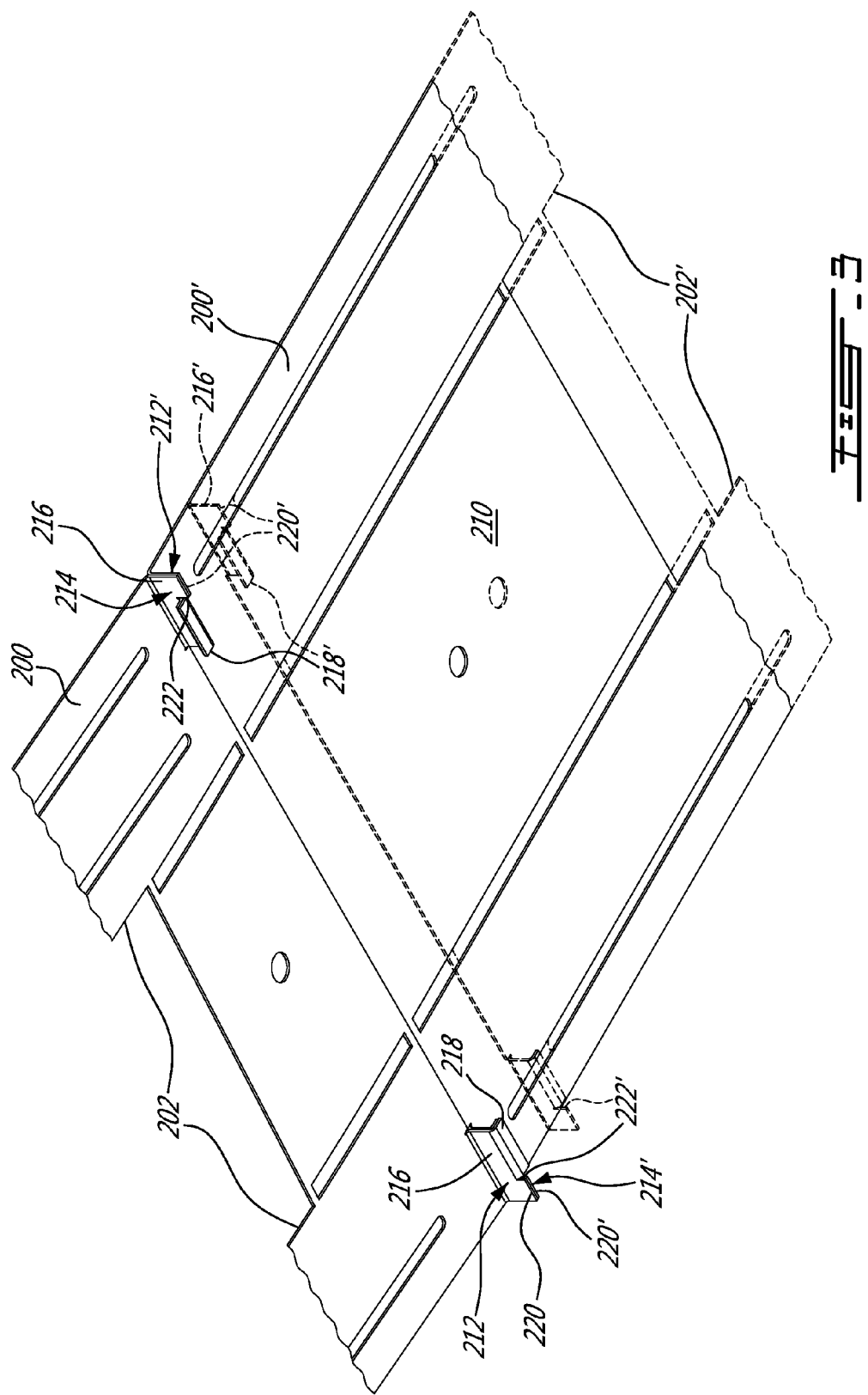

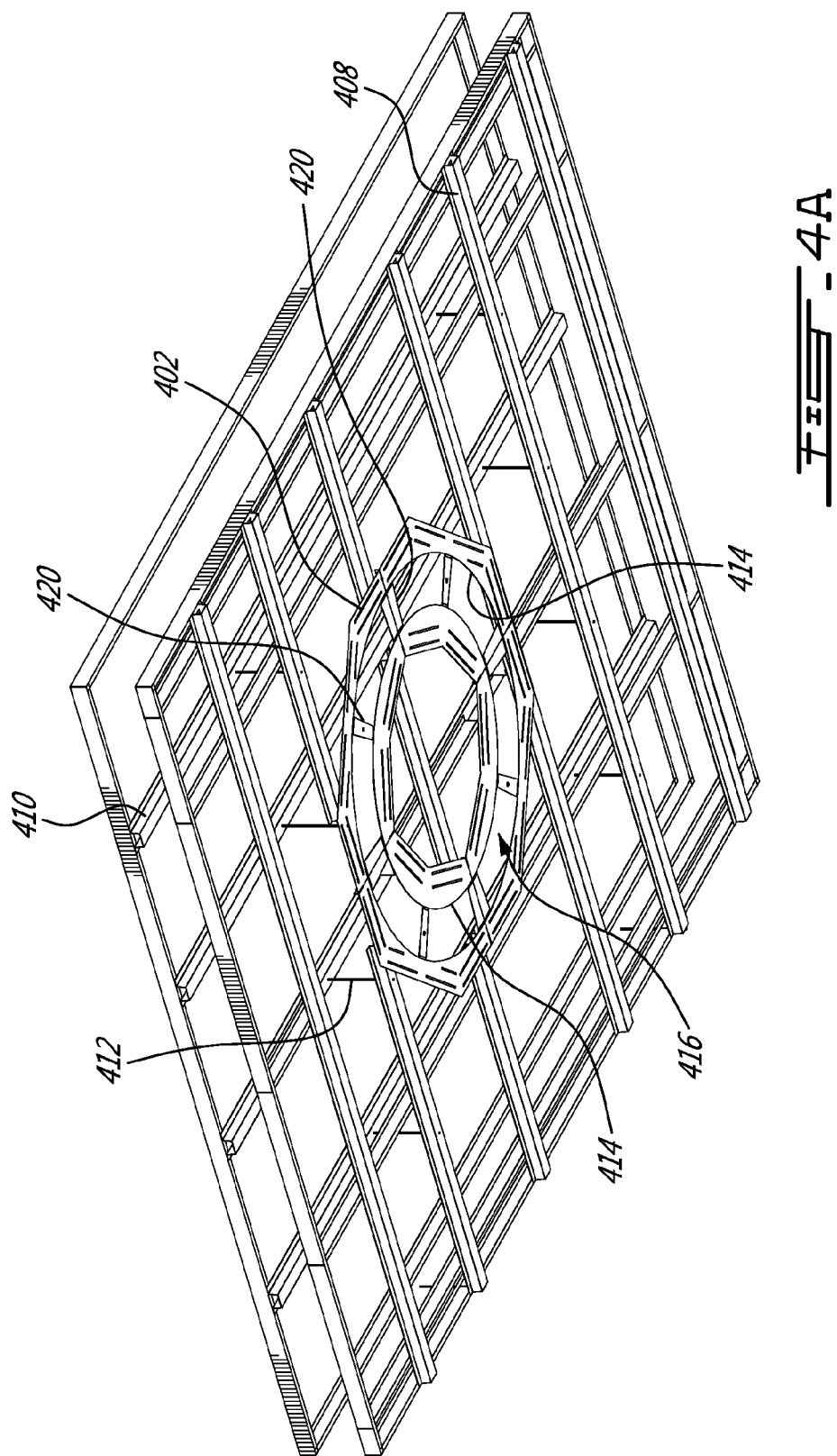

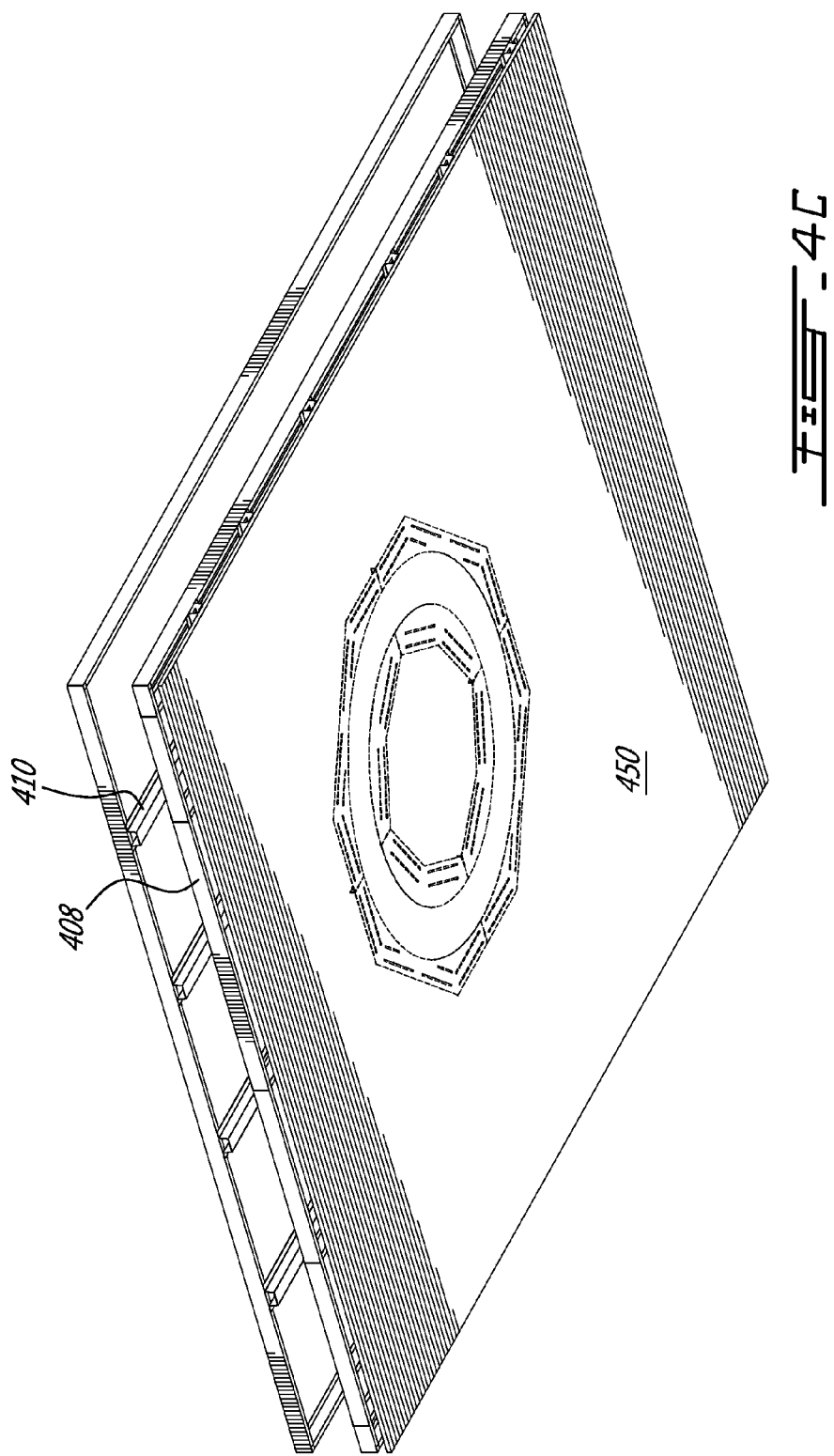

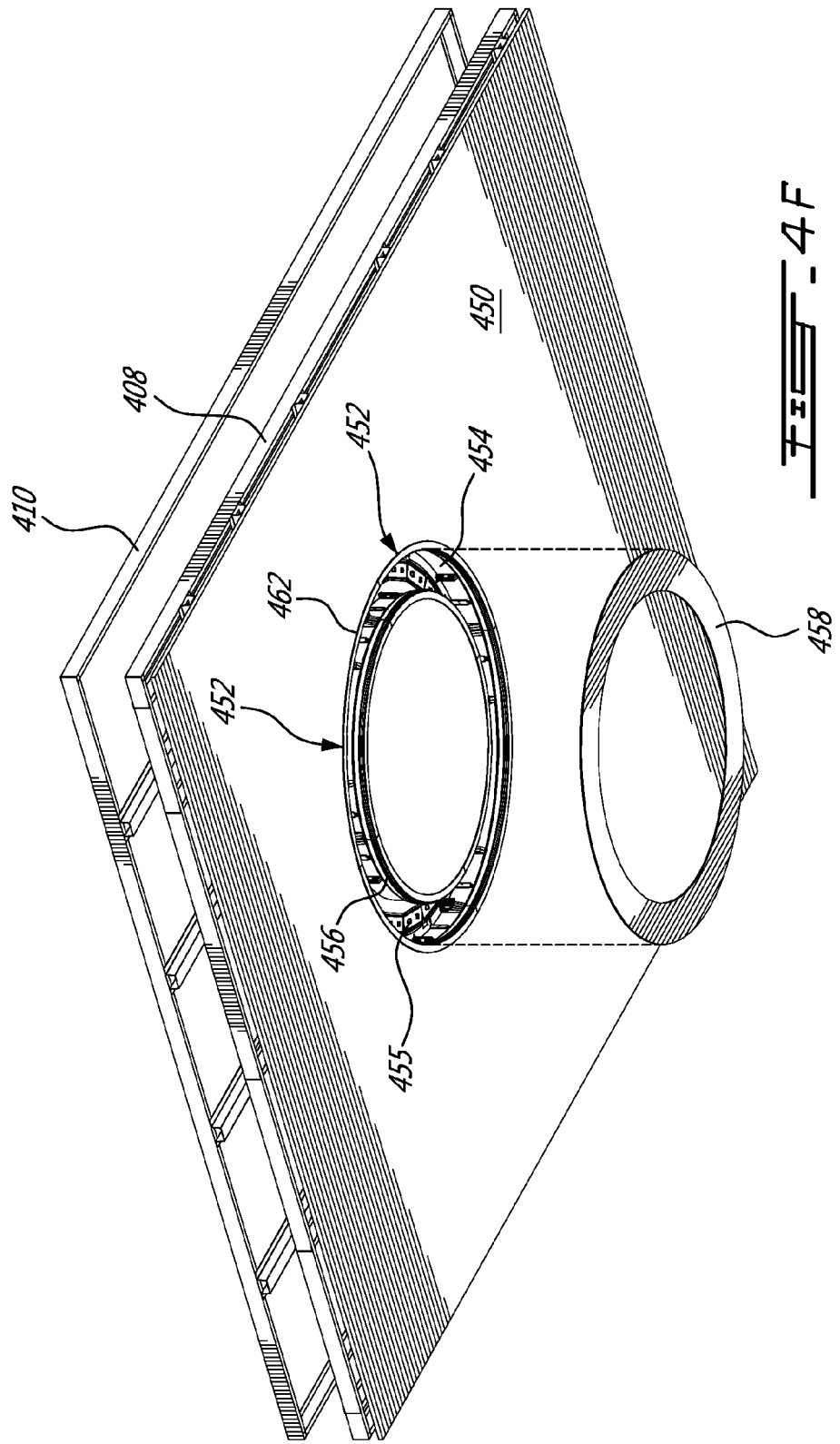

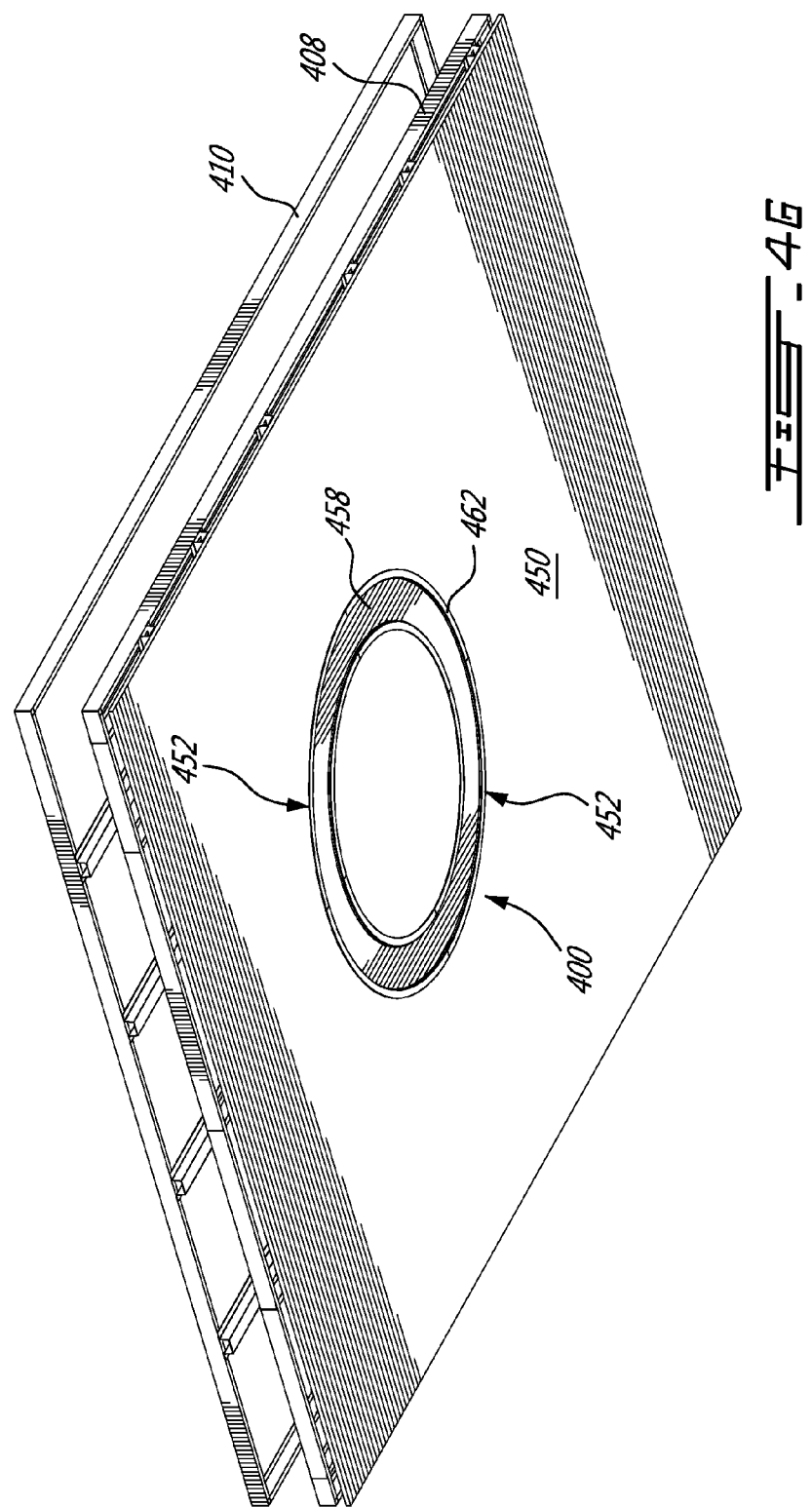

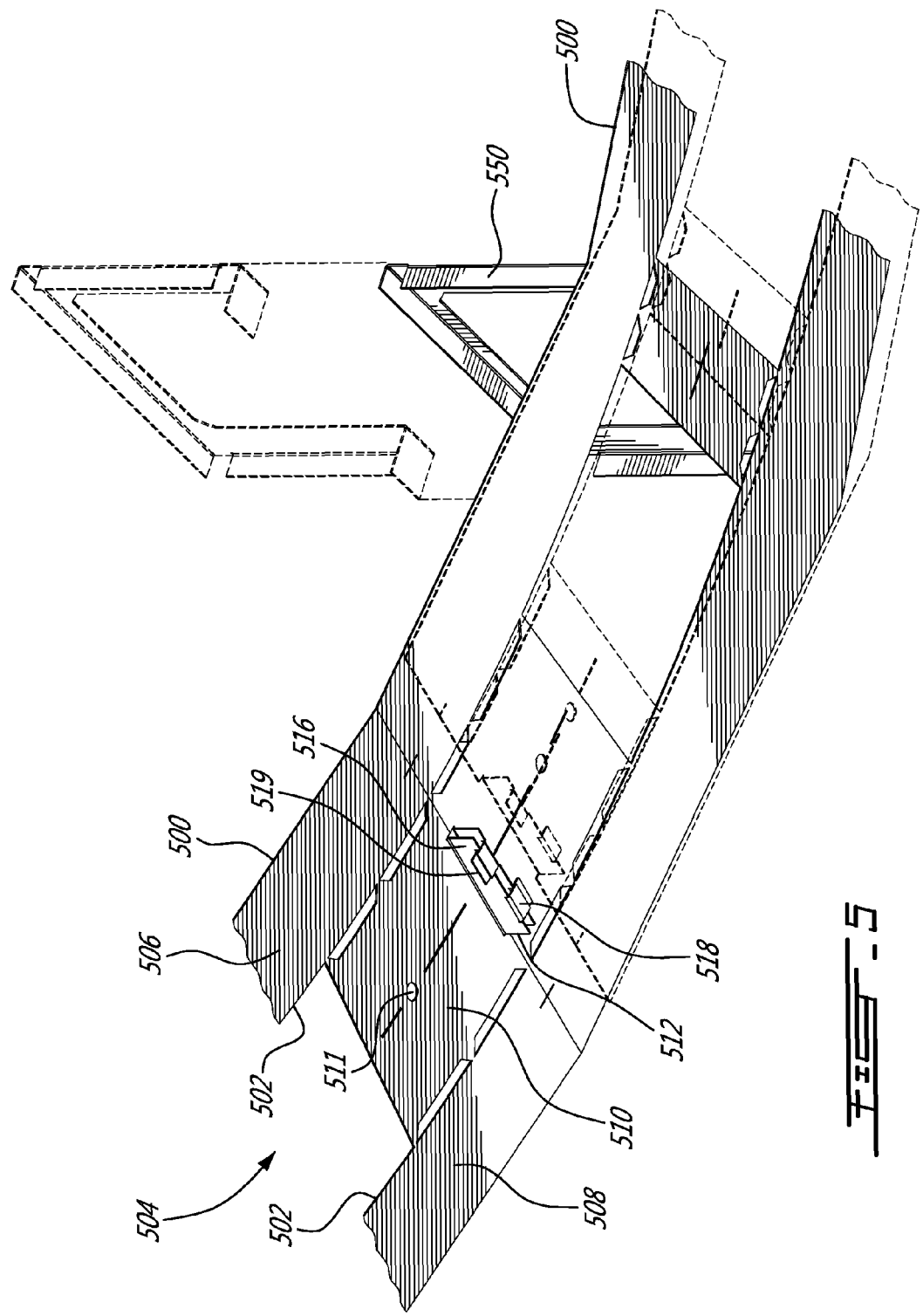

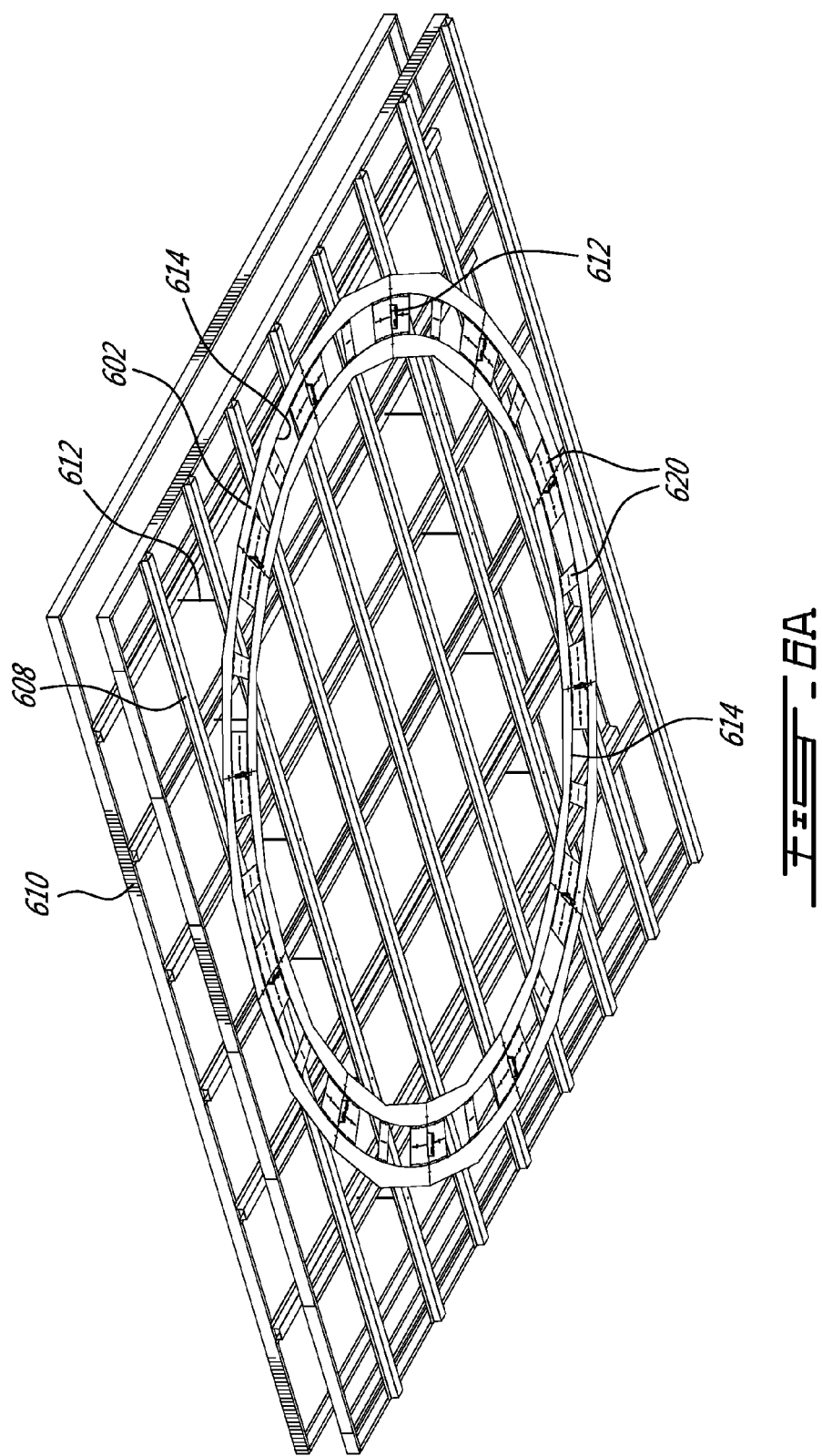

METHOD AND APPARATUS FOR OUTLINING RECESSED INSTALLATION OF A COMPONENT WITHIN A SURFACE MATERIAL

REFERENCE TO CO-PENDING APPLICATIONS

This application is a Continuation in Part of U.S. application Ser. No. 13/763,320, filed Feb. 8, 2013, and entitled METHOD AND APPARATUS FOR OUTLINING RECESSED INSTALLATION OF A COMPONENT WITHIN A SURFACE MATERIAL. Applicants also claim priority benefit to Canadian Patent application serial number 2,815,622, filed May 10, 2013, and entitled METHOD AND APPARATUS FOR OUTLINING RECESSED INSTALLATION OF A COMPONENT WITHIN A SURFACE MATERIAL. The entire subject matter of the above applications is incorporated by reference.

FIELD OF THE DISCLOSURE

The present disclosure relates to recessed installation methods, and in particular, to a method and apparatus for outlining recessed installation of a component within a surface material.

BACKGROUND

Recessed installation of a component within a surface material generally entails the formation of an aperture within the surface material dimensioned so to receive the component therethrough for installation. In some applications, a guide or template may be provided to guide formation of such apertures. For example, U.S. Pat. No. 6,220,137 for a Router Template Assembly and U.S. Patent Application Publication No. 2003/0115767 for a Template for Remodeler Lighting Application each provide a template or guide to be positioned on a mounting surface to guide formation of an aperture, the former for the installation of a recessed junction box, and the latter for the installation of a recessed light fixture. U.S. Pat. No. 7,497,025 for a Universal Installation Template and Method of Use for Placement of In-Wall or In-Ceiling Speakers, on the other hand, describes an adjustable template to be mounted prior to drywall installation so to guide the formation of an aperture in receiving an in-wall or in-ceiling speaker.

This background information is provided to reveal information believed by the applicant to be of possible relevance. No admission is necessarily intended, nor should be construed, that any of the preceding information constitutes prior art.

SUMMARY

Some aspects of this disclosure provide a method and apparatus for outlining recessed installation of a component within a surface material that overcome some of the drawbacks of known techniques, or at least, provides the public with a useful alternative.

In accordance with one aspect of the disclosure, there is provided a template for outlining disposition of a recessed component within a surface material, comprising: two or more template modules adjacently disposable against the surface material and each comprising opposed edges that can be aligned with adjacently disposed edges so to define a substantially continuous spacing along said adjacently disposed edges, said spacing dimensioned so to accommodate a corresponding component dimension; wherein said aligned edges guide removal of surface material along said spacing to accommodate recessed installation of the component within the surface material.

In accordance with another aspect of the invention, there is provided an assembly for outlining recessed installation of a luminaire within a surface material, comprising at least two alignment modules adjacently mountable against the surface material and each comprising opposed edges that can be aligned with adjacently disposed edges so to define a substantially continuous spacing along said adjacently disposed edges, said spacing dimensioned so to accommodate a width of the luminaire and thereby guide removal of the surface material within said spacing to outline recessed lengthwise installation of the luminaire therein.

In accordance with another aspect of the invention, there is provided a method for installing an assembly of luminaire modules recessed within a surface material in accordance with a designated assembly pattern, the method comprising: mounting end-to-end, for each of said luminaire modules, a corresponding template module comprising opposed inner edges spaced relative to one another so to at least accommodate a width of its corresponding luminaire module, wherein said inner edges of adjacently disposed template modules are aligned to define a substantially continuous spacing outlining the designated assembly pattern; laying the surface material over said mounted template modules; removing surface material within said spacing guided by said inner edges; and installing the assembly of luminaire modules within said spacing in accordance with the designated assembly pattern.

In accordance with another aspect, there is provided a template for outlining disposition of a recessed component within a surface material, the template comprising: a template module disposable against the surface material and comprising opposed edges defining a substantially continuous spacing along said disposed edges, said spacing dimensioned so to accommodate a corresponding component dimension; and a cross-bridge fixable or fixed to said template module and extending across said spacing in maintaining said spacing during installation; wherein said opposed edges guide removal of surface material along said spacing to accommodate recessed installation of the closed-loop component within the surface material.

Other aims, objects, advantages, aspects and features of the disclosure will become more apparent upon reading of the following non-restrictive description of specific embodiments, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 1 is a perspective view of different assemblies used in outlining recessed installation of respective components within a surface material, in accordance with different embodiments;

FIG. 2 is a perspective view of a template module for outlining recessed installation of a component, or module thereof, within a surface material, in accordance with one embodiment;

FIG. 3 is a perspective view of an end-to-end alignment of adjacent template modules, such as the module of FIG. 2, in accordance with one embodiment;

FIGS. 4A to 4G are sequential perspective views of a method for outlining and installing a recessed closed-loop luminaire within a false ceiling surface material, in accordance with one embodiment;

FIG. 5 is an exploded perspective view of a template assembly for outlining recessed installation of a component, or module thereof, within a surface material, in accordance with one embodiment; and FIGS. 6A and 6B are sequential perspective views of a method for outlining installation of a recessed closed-loop component within a false ceiling structure, in accordance with one embodiment.

DETAILED DESCRIPTION

Figure 4B:
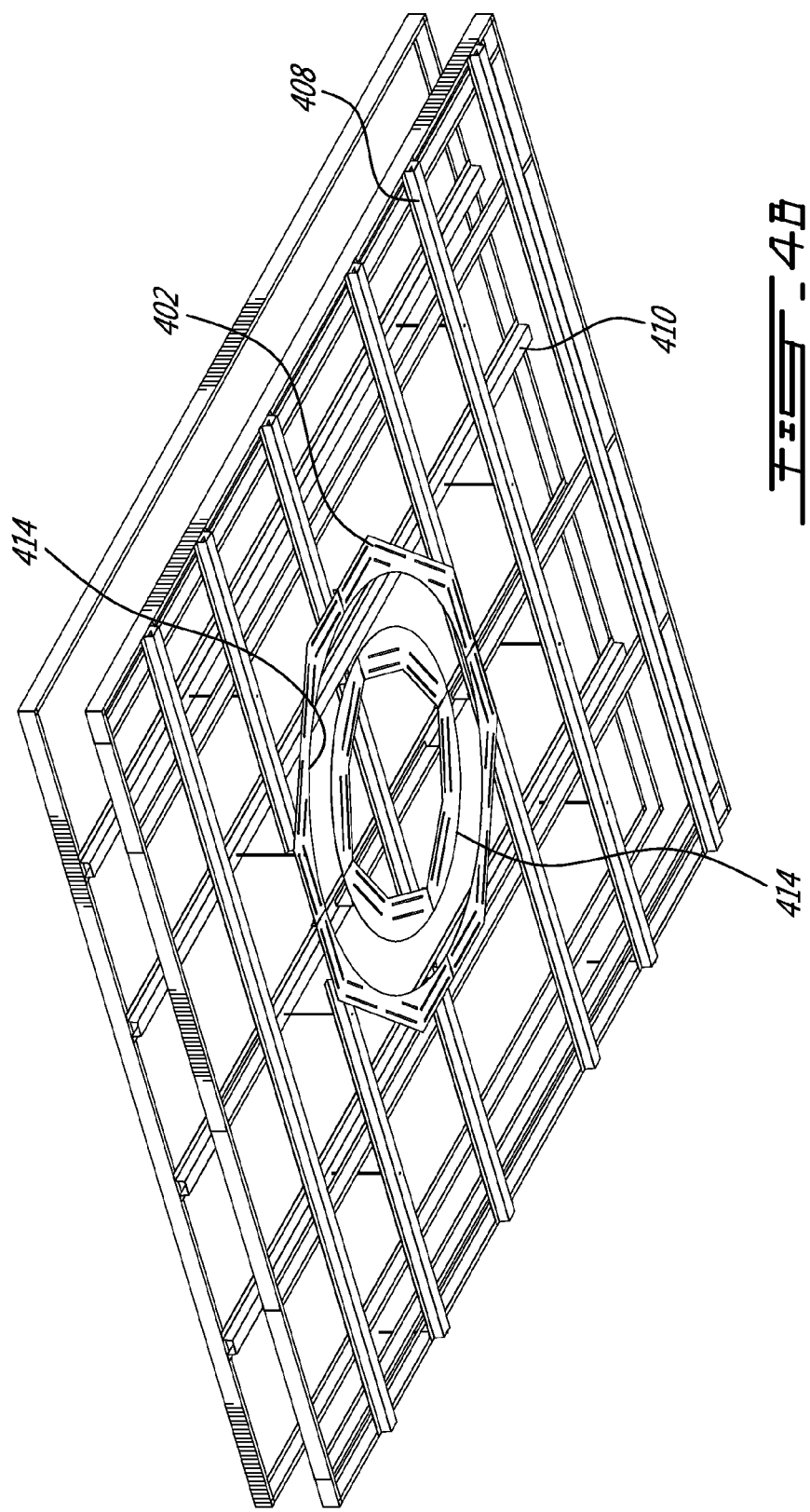
Figure 4D:
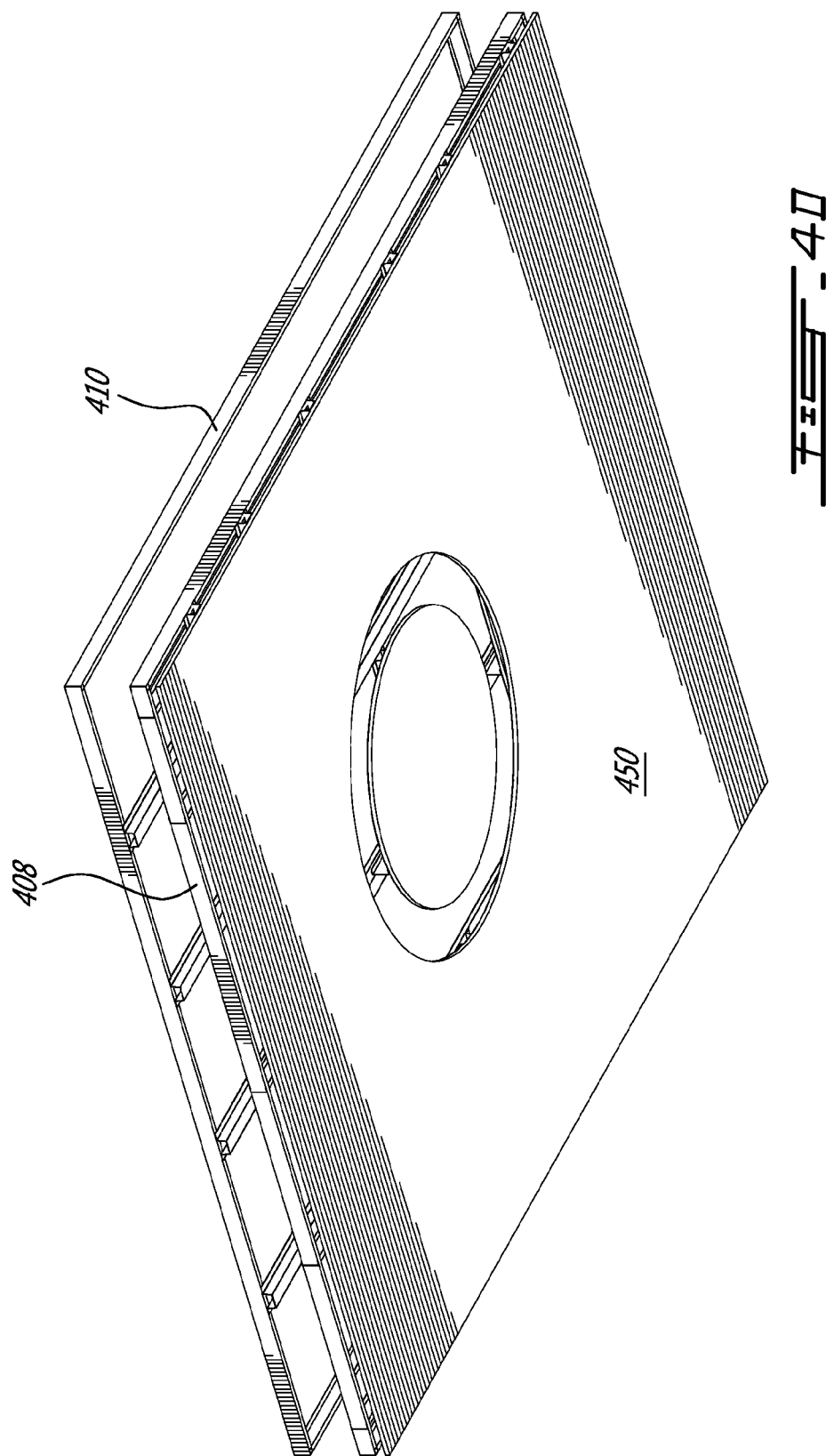

With reference to the disclosure herein and the appended figures, a method and apparatus for outlining recessed installation of a component within a surface material will now be described, in accordance with different embodiments.

With reference to FIG. 1, and in accordance with different embodiments, a series of template modules 100 are shown mounted and aligned in various configurations to outline a recessed installation of different components, such as luminaires, within a surface material (e.g. see surface material 450 of FIG. 4C to 4G). For instance, different combinations of rectilinear modules 102 and/or curvilinear modules 104 are shown in the formation of different combined installation patterns, which may include in some examples, a closed-loop pattern such as circle formation 106.

In one embodiment, each template or alignment module 102, 104 is mounted to a surface support structure, in this example consisting of a false ceiling grid 108 suspended from a structural ceiling 110 via support rods 112 or the like, to which a surface material (see FIG. 4C for example) may be subsequently installed to provide a finished appearance. As will be described in greater detail with reference to FIGS. 4A to 4G, the inner edges 114 of the aligned modules 102, 104 define a substantially continuous spacing 116 that reflects a designated pattern of the component to be installed recessed within the surface material. These inner edges 114 may thus provide guidance in the subsequent removal of surface material from within this spacing 116 (e.g. see FIG. 4D) to define an aperture within the surface material consistent with the component to be installed recessed therein.

With reference to FIG. 2, a given module 200, in this example a curved module, generally comprises opposed longitudinal edges 202 distanced relative to one another so to define a lateral spacing 204 therebetween, generally selected to at least accommodate a width of the component to be installed. For instance, in the example described below, the module 200 is dimensioned to outline installation of a curved or arcuate luminaire module, wherein a width of the spacing 204 is selected to accommodate at least a width of the luminaire module.

In this example, the opposed edges 202 are defined by the opposed inner edges of laterally spaced planar members 206, 208, a planarity of which serving to facilitate installation of the module 200 against the surface material (not shown) in which a recessed installation aperture is to be defined. A series of linear fastening slots 209 are also provided through planar members 206, 208 to facilitate mounting of the module 200 to an appropriate support structure, such as false ceiling structure 108 of FIG. 1, or again to the surface material itself in some examples.

In this embodiment, one or more removable crosslinks or like structures 210 are also provided to define and maintain a set spacing between edges 202 during installation, which crosslinks 210 may then be removed to provide for unobstructed guided surface material removal along the inner edges 202.

In this embodiment, crosslinks 210 are also provided with alignment apertures (or other such datum) 211 to facilitate alignment of the template modules for installation and to assist in locating the position of designated recessed component support structures during pre-installation, for example to guide the pre-installation of support rods in the context of a recessed luminaire to be supported within a false ceiling structure or grid (e.g. see example of FIGS. 4A to 4G). In one exemplary installation sequence for a ceiling mounted component, the modules 202 may be aligned on the ground in their intended configuration and directly below the intended location of the component installation. The location of the apertures 211, and possibly of other datums/features (e.g. cut-out lines, edges, corners, etc.) in the template module, may be marked on the ground. One or more lasers (e.g. a laser pointer or the like) may then be aligned with these ground markings and aimed to the ceiling as the template modules are positioned consistent with those markings. The apertures 211 may thereafter be used to locate and align installation of corresponding component support structures, such as threaded rods adapted to support recessed luminaire modules, for example as described in the below example.

With added reference to FIG. 3, each module 200 further comprises a pair of alignment structures 212, 214 respectively defined at each longitudinal extremity thereof, namely at each corner, for alignment and cooperative engagement with corresponding alignment structures 214', 212', respectively, of an adjacently disposed template module 200'. In this example, each alignment structure 212, 214 comprises a longitudinal alignment feature, such as vertical tab 216, for guiding end-to-end abutment of adjacent modules. Each alignment structure 212, 214 further comprises a lateral alignment feature, in this example extending from vertical tab 216 and defined by a bent horizontal foot 218 split from a vertical tab extension 220 so to cooperatively engage, in the context of alignment structure 212, a lateral edge 222' of an adjacently disposed alignment structure 214', and in the context of alignment structure 214, so to allow for cooperative engagement of an adjacent horizontal foot 218' of and adjacently disposed alignment structure 212' against lateral edge 222. Accordingly, respective inner edges 202, 202' may be effectively aligned in forming a substantially continuous spacing 204, particularly upon subsequent removal of crosslinks 210.

It will be appreciated that different alignment features and/or structures may be provided in the context of the above-described and similar template modules to improve lateral and/or longitudinal alignment between adjacently disposed modules. For instance, different markings and/or structures may be provided toward or along the module extremities to be aligned in providing similar results, and that, without departing from the general scope and nature of the present disclosure.

With reference now to FIGS. 4A to 4G, an exemplary recessed ceiling luminaire installation will now be described, in accordance with one embodiment of the invention. In this example, an assembly of template or alignment modules 402, for example as described above with reference to FIG. 2, are provided for outlining recessed installation of a circular closed-loop luminaire (e.g. see installed luminaire 400 of FIG. 4G).

As best seen in FIG. 4A, the modules 402 are first adjacently mountable end-to-end to a surface support structure, in this example consisting of a false ceiling grid 408 suspended from a structural ceiling 410 via support rods 412 or the like. To accommodate the downstream recessed installation of the luminaire, elements of the false ceiling grid 408 that would otherwise interfere with the recessed installation are removed, and/or omitted.

Alignment structures, such as those described above with reference to FIGS. 2 and 3, may facilitate and/or improve alignment of the various modules 402 so to provide greater adherence to a designated luminaire outline pattern, or again to ensure or promote adherence to a prescribed mounting aperture tolerance, namely to reduce gaps that may ultimately result between the installed luminaire and surrounding surface material. As seen in FIG. 4A, the assembly of four (4) arcuate modules 402 results in the formation of a ring-like pattern having, in this particular example, a 3 foot diameter.

With reference to FIGS. 4A and 4B, once the modules 402 are adequately aligned and mounted, the inner edges 414 thereof define, in combination, a substantially continuous spacing 416 that reflects the designated pattern of the luminaire to be installed. The crosslinks 420 may then be removed (e.g. snipped, cut and/or broken off) such that inner edges 414 may provide a substantially unobstructed guide (e.g. see FIG. 4B) for the subsequent removal of surface material within the continuous spacing 416 so defined.

As shown in FIG. 4C, a selected surface material 450 may then be installed over and against the mounted modules 402, keeping track of a general location of the previously installed modules 402 (shown in phantom lines) for subsequent steps. Using an appropriate tool, such as a saw, knife, router or other such rotary tool, or other tool appropriate for the surface material at hand, the aligned inner edges 414 may be used as a guide in removing surface material from the spacing 416, resulting in a surface aperture consistent with the designated luminaire pattern (e.g. see ring-shaped aperture of FIG. 4D).

Figure 4E:
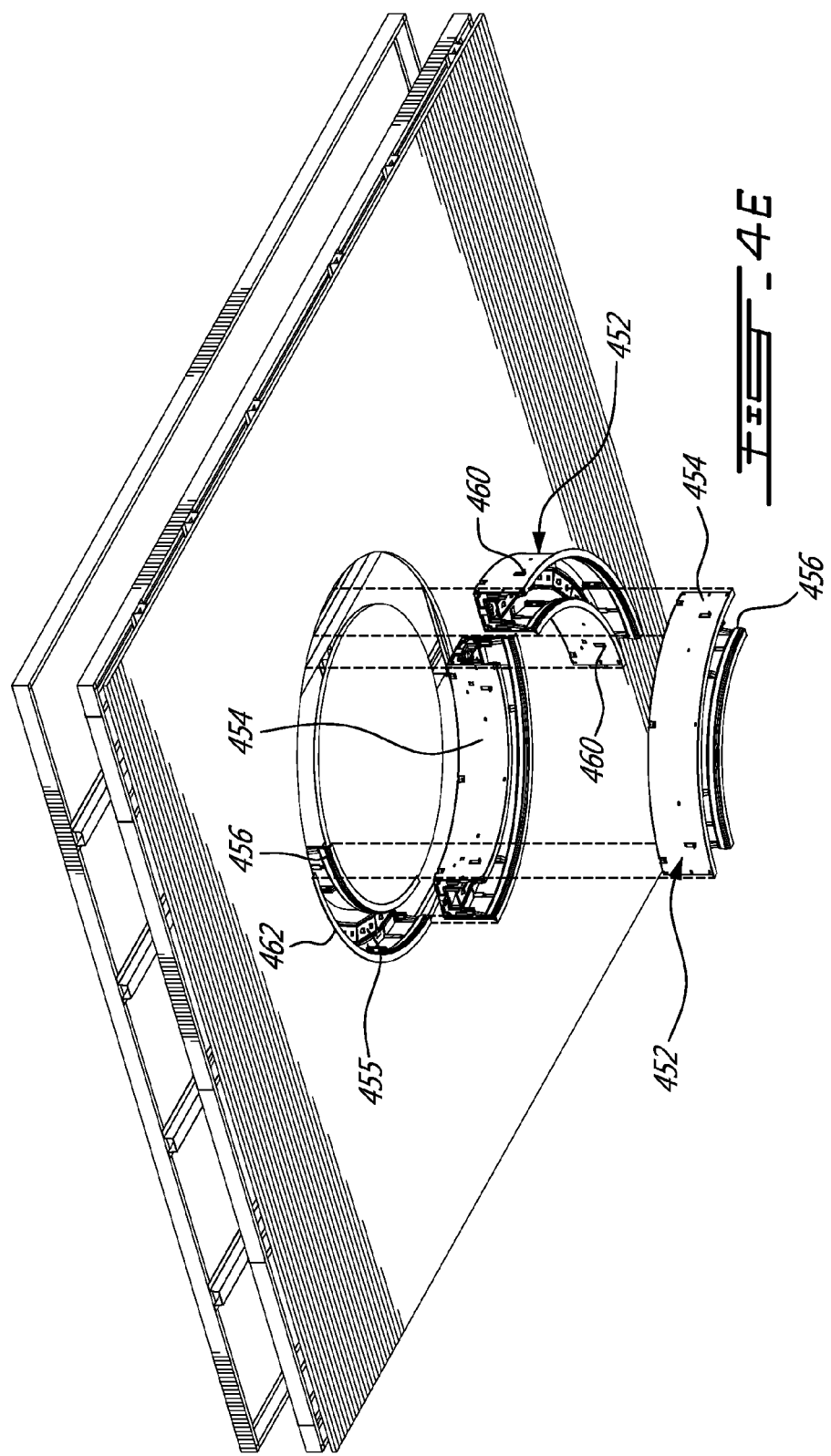

With reference to FIGS. 4E to 4G, and in accordance with one embodiment, the luminaire 400 comprises an assembly of four (4) curvilinear luminaire modules 452, each one of which comprising an arcuate housing 454 (e.g. housing various lighting components such as LED boards 455, and associated driving means) to be assembled end-to-end in forming the designated pattern. For instance, each housing 454 may be installed in sequence, for example via appropriate fastening means (e.g. bolts, screws, cables and the like—not shown) rigidly coupling a base of the housing to the structural ceiling 410, and interconnected to each subsequent housing via appropriate end-to-end coupling means (e.g. such as end brackets, clamps and the like—not shown), for example. Alternatively, each housing 454 may be pre-assembled in the designated configuration and installed as an assembled unit. These and other such considerations will be readily appreciated by the skilled artisan, and are therefore intended to fall within the general scope and nature of the present disclosure.

In this embodiment, each housing 454 is further provided with an adjustment bracket 460 which, upon adjustment, displaces its outwardly projecting foot to press against the edge of its corresponding template module (i.e. on the hidden side of the surface material 450) and thus squeeze the juxtaposed edges of the surface material and template module at the aperture between the foot of the adjustment bracket 460 and an outer flange 462 of the luminaire module 452. Accordingly, the template module may not only act as an alignment tool and guide for the outlining of the luminaire installation, but also provide reinforcement at the edge of the surface material aperture in securing a flush installation of the luminaire' s outer flange 462, ultimately promoting a more refined finish.

Each module 452 further comprises an output lens coupling mechanism 456 along its periphery for the subsequent installation of an output lens, in this example consisting of a seamless ring-shaped flat lens 458 that snaps into place along its inner and outer edges. In one example, the output lens coupling mechanism 456 consists of opposed resiliently biased coupling flanges shaped and configured to expand upon the lens being pushed against it, and spring back into position to hook and thus retain the edges of the lens 458 in position. Other coupling mechanisms may also be considered, as can other lens or output component configurations (e.g. partitioned lens, filter, mask, diffuser, etc.), as will be readily appreciated by the skilled artisan.

As seen from this example, the assembly of template modules may include a corresponding alignment module 402 for each of the luminaire modules 452, thereby allowing for outlining of the combined pattern prior to installation of the luminaire 450. Using this approach, and considering different combinations of template module shapes, sizes and/or configurations (e.g. rectilinear modules and/or curved modules, possibly of different turning radii), different examples of luminaire patterns may include, but are not limited to, closed loop patterns such as circles, ovals and the like; linear patterns such as square or rectangular boxes, X-shaped patterns, etc.; curvilinear patterns such as sinusoids, curls, spirals, squiggle lines and the like; and various combinations thereof, to name a few.

In the illustrated embodiment of FIGS. 4A to 4G, each module is mountable to a surface support structure prior to installation of the surface material. In a similar embodiment, the modules may rather be mounted directly to the surface material, for example via appropriate fasteners and/or adhesives, to be removed thereafter (or left there as an aesthetic complement to the luminaire).

As will be appreciated by the skilled artisan, template or alignment modules such as those described above may be manufactured of different materials, which may include, but are not limited to, rigid plastics, polymers or other such composites, or again of different sheet metals such as steel or aluminum, to name a few. Modules may be stamped or otherwise formed depending on the material selection, and cut or punched to size and/or to exhibit the various features described above. Furthermore, while the above contemplates the provision of substantially flat modules, other shapes and sizes may be readily applied depending on the intended application. For example, where the apparatus is to be installed between a surface material support structure and the surface material itself, then it may be advantageous to have the templates formed of a substantially flat material. On the other hand, where the modules are to be aligned and installed above the surface material, while the provision of a flat contact surface may be desirable, the general thickness profile of the modules may take different forms, for instance in facilitating manipulation in manual installation, for example. These and other such considerations will be readily apparent to the person of ordinary skill in the art, and are therefore intended to fall within the general scope and nature of the present disclosure.

Furthermore, while the above illustrates a recessed ceiling installation, similar installations may also be considered in a wall or floor surface, or again along other surface geometries, such as in-room partitions, furniture, exterior accent or ambient lighting structures, interior lighting accent architectures and the like. Accordingly, while terms such as up/down, vertical, horizontal and the like apply in the selected orientation of the illustrated embodiments, it will be appreciated that reorientation of these embodiments and their equivalents may entail a corresponding realignment of general descriptive directional terms used herein, without departing from the intended scope of the present disclosure. Namely, directional terms are used herein solely for the purpose of illustrating one particular embodiment, and should not be construed as limiting within the general context of this disclosure as a whole.

The apparatus and method described herein may also be applicable for the outlining and recessed installation of a component within different surface materials. Examples of materials may include, but are not limited to, drywall, plasterboard, gypsum board and/or other such materials, as can other materials apply such as plywood, particle board, sheet metal and/or plastics, and the like, to name a few. Namely, while the selection of tools for the subsequent guided removal of material from the continuous gap defined by the aligned modules may vary depending on the material at hand, as can the selection of material for the modules itself change depending on the strength/durability required thereof in guiding such tool selection, similar principles may nevertheless be applied in outlining a recessed installation within a variety of material surfaces, and that, all within the general context of the present disclosure.

Furthermore, while an exemplary embodiment contemplates the outlining of a recessed luminaire installation, other recessed component installations may also be considered, particularly in the context where a shape and size of the component is amenable to a modular assembly of linear (e.g. rectilinear and/or curvilinear) subcomponents, and/or again, outlined via an assembly of end-to-end and/or juxtaposed modules defining a unitary component profile. As it will be appreciated by the skilled artisan, while the above makes reference to generally linear, longitudinal or lengthwise components, modules, and assembled patterns, this linearity will be understood to encompass different patterns generally defined by the alignment of end-to-end and/or juxtaposed components having a combined outline generally describable by a series of assembled linear (rectilinear and/or curvilinear) segments, as well as combinations of such linear outlines, which may not only include free-ended patterns, but also include closed-loop patterns and/or patterns exhibiting one or more linear crossings (e.g. X-shaped components) and the like.

FIG. 5 provides an exploded perspective view of two adjacently disposed template modules 500, in accordance with another embodiment. Each module 500, in this example again consisting of a curved module, generally comprises opposed longitudinal edges 502 distanced relative to one another so to define a lateral spacing 504 therebetween, generally selected to at least accommodate a width of the component to be installed. For instance, as in the example described above, the module 500 may be dimensioned to outline installation of a curved or arcuate luminaire module, wherein a width of the spacing 504 is selected to accommodate at least a width of the luminaire module.

In this example, the opposed edges 502 are defined by the opposed inner edges of laterally spaced planar members 506, 508, a planarity of which serving to facilitate installation of the module 500 against the surface material (not shown) in which a recessed installation aperture is to be defined. Unlike the embodiment described above with reference to FIG. 2, however, linear fastening slots 209 are omitted through planar members 506, 508, requiring rather that mounting of the module 500 to an appropriate support structure be implemented via fasteners driven directly through the members 506, 508.

In this embodiment, one or more removable crosslinks or like structures 510 are also provided to define and maintain a set spacing between edges 502 during installation, which crosslinks 510 may then be removed to provide for unobstructed guided surface material removal along the inner edges 502. In this embodiment, crosslinks 510 located at each end of each template 502 are also provided with alignment apertures 511 (or other such datum) to facilitate alignment of the template modules for installation and to assist in locating the position of designated recessed component support structures during pre-installation, for example to guide the pre-installation of support rods in the context of a recessed component to be supported within a false ceiling structure or grid (e.g. see example of FIGS. 6A and 6B). In one exemplary installation sequence for a ceiling mounted component, the modules 502 may be aligned on the ground in their intended configuration and directly below the intended location of the component installation. The location of the apertures 511, and possibly of other datums/features (e.g. cut-out lines, edges, corners, etc.) in the template module, may be marked on the ground. One or more lasers (e.g. a laser pointer or the like) may then be aligned with these ground markings and aimed to the ceiling as the template modules are positioned consistent with those markings. The apertures 511 may thereafter be used to locate and align installation of corresponding component support structures, such as threaded rods adapted to support recessed luminaire modules, for example as described in the below example.

Each module 500 further comprises a centrally located alignment structure 512 defined at each longitudinal extremity thereof for alignment and cooperative engagement with corresponding alignment structures of adjacently disposed template modules. In this example, alignment structures 512 are integrally formed to depend from the extremities of distal crosslinks 510, and are thus, as will be described in greater detail below, ultimately removed during the installation process to reduce interference with the subsequent installation of the surface material and/or recessed component or module. In this embodiment, each alignment structure 512 comprises a longitudinal alignment feature, such as vertical tab 516, for guiding end-to-end abutment of adjacent modules. Each alignment structure 512 further comprises a lateral alignment feature, in this example extending from vertical tab 516 and defined by opposed bent horizontal feet 518, 519 split from within vertical tab 516 so to cooperatively engage adjacently disposed alignment structures, in a similar fashion as described above with reference to FIG. 3. In one embodiment, a screw or other such fastener may be driven through tab 516 of adjacent modules 502 once in position so to better secure alignment of the adjacent modules. Accordingly, respective inner edges 502 of adjacently disposed modules 500 may be effectively aligned in forming a substantially continuous spacing 504, particularly upon subsequent removal of crosslinks 510.

As shown in FIG. 5, each module is further provided with one or more cross-bridges (e.g. U-shaped bridges) 550 fixable or fixed upon laterally spaced planar members 506, 508 and across spacing 504 so to further maintain this spacing during the installation process, for instance upon removing the crosslinks 510. Use of these bridges will be further described below within the context of the installation sequence described with reference to FIGS. 6A and 6B. It will be appreciated that different bridge shapes and configurations can be readily applied to the present context, as can different assembly methods considered, without departing from the general scope and nature of the present disclosure.

Figure 6B:
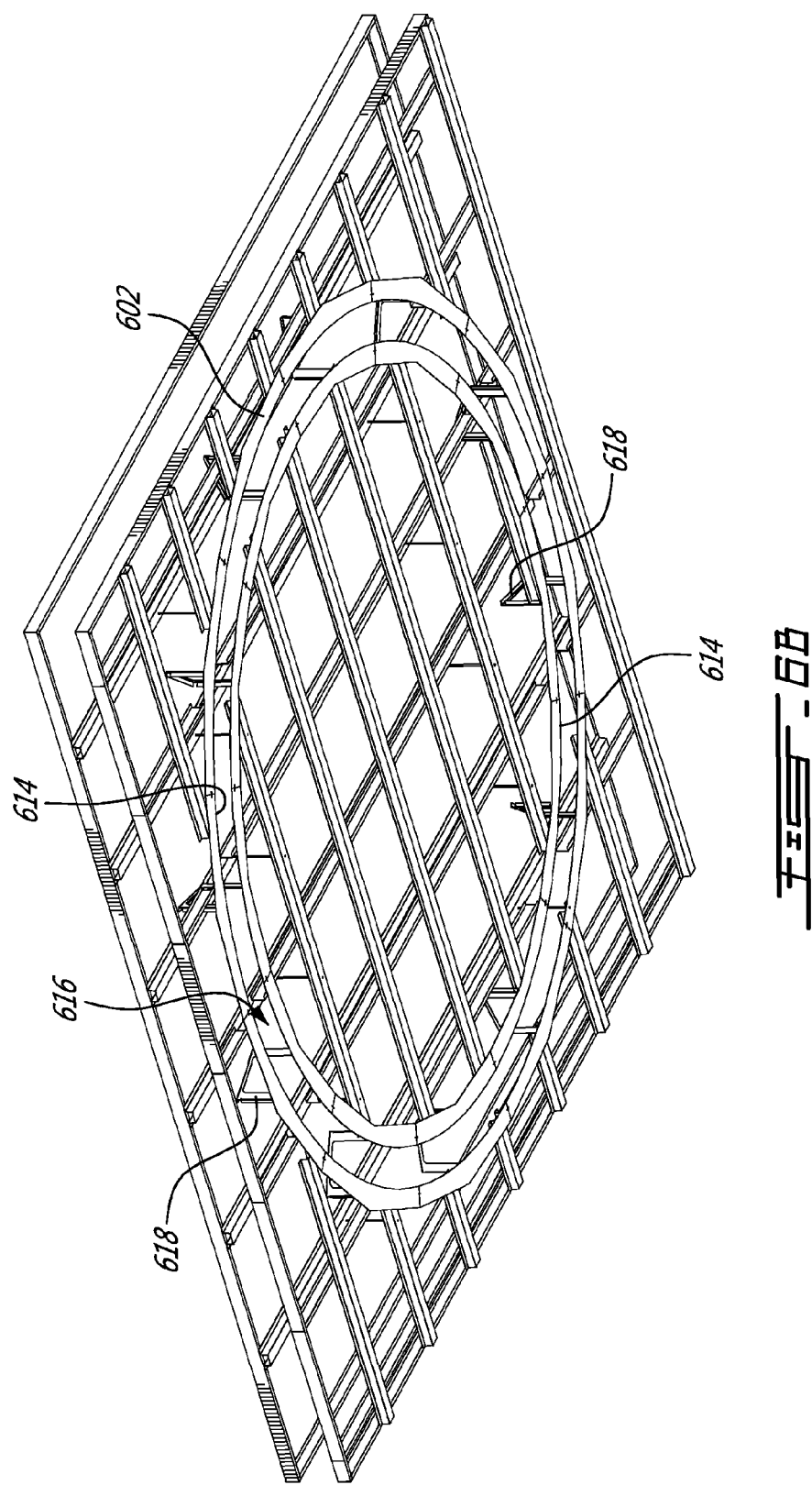

With reference now to FIGS. 6A and 6B, and in accordance with one embodiment, an exemplary method for outlining a recessed installation using template modules such as modules 500 of FIG. 5, will now be described. In this example, an assembly of template or alignment modules 602, for example as described above with reference to FIG. 5, are provided for outlining recessed installation of a circular closed-loop component (e.g. such as installed luminaire 400 of FIG. 4G). Other closed-looped configurations can also be considered (e.g. oval, irregular loop, etc.), as can linear, curvilinear and/or rectilinear patterns, to name a few.

As best seen in FIG. 6A, the modules 602 are first adjacently mountable end-to-end to a surface support structure, in this example consisting of a false ceiling grid 608 suspended from a structural ceiling 610 via support rods 612 or the like.

Alignment structures 612, such as those described above with reference to FIG. 5, may facilitate and/or improve alignment of the various modules 602 so to provide greater adherence to a designated component outline pattern, or again to ensure or promote adherence to a prescribed mounting aperture tolerance, namely to reduce gaps that may ultimately result between the installed component and surrounding surface material. As seen in FIG. 6A, the assembly of twelve (12) arcuate modules 602 results in the formation of a ring-like pattern having, in this particular example, an 8 foot diameter.

With added reference to FIG. 6B, once the modules 602 are adequately aligned and mounted, the inner edges 614 thereof define, in combination, a substantially continuous spacing 616 that reflects the designated pattern of the component to be installed. To maintain this spacing during subsequent steps, respective bridges 618 are coupled to each of the modules 602. In this example, the extremities of the U-shaped bridges 618 are fastened on either side of the spacing 616, as shown for example in FIG. 5. Where the installation of some bridges 618 is obstructed by portions of the ceiling grid 608 (i.e. channels/furrings), these obstructing portions may be removed at this point. It will be appreciated that while distinct bridges 618 are provided in this example for installation upon the mounted modules 602, other embodiments may rather include integral or preinstalled bridges to achieve a similar effect, as will be readily appreciated by the skilled artisan.

To accommodate the downstream recessed installation of the circular component, elements of the false ceiling grid 608 that would otherwise interfere with the recessed installation are also identified and removed, and the remaining structure reinforced as appropriate to ensure a secure installation and promote adherence to the intended installation pattern.

The crosslinks 620 may then or concurrently be removed (e.g. snipped, cut and/or broken off) such that inner edges 614 may provide a substantially unobstructed guide for the subsequent removal of surface material within the continuous spacing 616 so defined. With the alignment structures 612 forming part of the crosslinks, they to ultimately end up being removed, and thus reduce the likelihood of interference with other components during downstream installation processes.

The provision of bridges 618 in this example contribute to maintaining the spacing 616 consistent with the originally intended spacing of the modules 602 once the crosslinks 620 are removed, and in some cases, while isolated elements of the ceiling grid 608 (e.g. within the closed-loop pattern) are adequately reinforced/stabilized. In some embodiments, the bridges 618 may then be removed, though in the current embodiment, they are illustratively maintained as further structural reinforcement throughout subsequent installation steps. Again, this may be particularly helpful in the context of a closed-loop pattern, where an internal ceiling portion could otherwise be prone to misalignment during different steps of the installation process.

Subsequent steps in the installation process may, in some embodiments, follow similar steps as those outlined above with reference to FIGS. 4C to 4G, for example in the installation of a recessed ring-shaped luminaire.

While the present disclosure describes various exemplary embodiments, the disclosure is not so limited. To the contrary, the disclosure is intended to cover various modifications and equivalent arrangements, as will be readily appreciated by the person of ordinary skill in the art.

The invention claimed is:

1. A template for outlining disposition of a recessed component within a surface material, comprising:
   two or more template modules adjacently disposable against the surface material and each comprising opposed edges that can be aligned with adjacently disposed edges so to define a substantially continuous spacing along said adjacently disposed edges, said spacing dimensioned so to accommodate a corresponding component dimension;
   wherein said aligned edges guide removal of surface material along said spacing to accommodate recessed installation of the component within the surface material.

2. The template of claim 1, wherein said template modules are mountable to a surface material support structure prior to surface material installation so to allow surface material installation over said aligned edges for subsequent guided removal of the surface material within said spacing.

3. The template of claim 2, wherein each template module comprises opposed laterally spaced and substantially planar members disposable between the surface material and the support structure, wherein said opposed edges are defined by respective opposed inner edges of said laterally spaced members, and wherein said substantially planar members provide reinforcement to the surface material along said spacing in securing, at least in part, subsequent installation of the component.

4. The template of claim 1, wherein each of said template modules comprises opposed laterally spaced members and wherein said opposed edges are defined by respective opposed inner edges of said laterally spaced members.

5. The template of claim 4, wherein said laterally spaced members comprise substantially planar members disposable against the surface material.

6. The template of claim 4, wherein said laterally spaced members are distanced by one or more cross structures or links disposed between said inner edges so to define said substantially continuous spacing.

7. The template of claim 6, wherein at least one of said cross structures or links have defined therein an installation alignment aperture positioned to facilitate alignment between the template and corresponding component support hardware during installation.

8. The template of claim 6, wherein said one or more cross structures or links are removable upon installation of said modules so to enable unobstructed guided removal of the surface material within said spacing along said aligned edges.

9. The template of claim 8, wherein each of said template modules comprises at least one alignment feature defined at a longitudinal extremity thereof to depend from a corresponding cross structure or link, said alignment feature for alignment with a corresponding alignment feature of an adjacently disposed template module and subsequently removable upon removal of said corresponding cross structure or link.

10. The template of any one of claim 1, wherein each of said template modules comprises at least one alignment feature defined at a longitudinal extremity thereof for alignment with a corresponding alignment feature of an adjacently disposed template module.

11. The template of claim 10, wherein said alignment feature comprises an alignment structure extending from said extremity to engage a corresponding alignment structure of said adjacently disposed template module.

12. The template of claim 11, wherein said alignment structure comprises a longitudinal component and a lateral component disposed so to respectively engage a corresponding longitudinal component and lateral component of said corresponding alignment structure, thereby promoting longitudinal and lateral alignment of said adjacently disposed edges.

13. The template of claim 1, the component comprising a luminaire to be recessed within the surface material along said spacing.

14. The template of claim 1, the component comprising a curvilinear component, said two or more template modules comprising at least one curved template defining curved opposed edges in defining a curvilinear spacing therebetween.

15. The template of claim 1, further comprising at least one cross-bridge fixed or fixable to at least one of said template modules to extend across said spacing in maintaining said spacing during installation.

16. The template of claim 15, wherein said cross-bridge extends outside a plane defined by said opposed edges so to avoid interfering with a subsequent installation of the component recessed therebetween.

17. An assembly for outlining recessed installation of a luminaire within a surface material, comprising
at least two alignment modules adjacently mountable against the surface material and each comprising opposed edges that can be aligned with adjacently disposed edges so to define a substantially continuous spacing along said adjacently disposed edges, said spacing dimensioned so to accommodate a width of the luminaire and thereby guide removal of the surface material within said spacing to outline recessed lengthwise installation of the luminaire therein.

18. The assembly of claim 17, wherein the luminaire consists, at least in part, of a curvilinear luminaire, wherein at least one of said alignment modules comprises curved edges so to define a curvilinear spacing therebetween and thereby accommodate the curvilinear luminaire.

19. The assembly of claim 17, wherein the luminaire consists of an assembly of rectilinear luminaire modules, curvilinear luminaire modules or curvilinear and rectilinear luminaire modules to be assembled in forming a combined pattern, the assembly including a corresponding alignment module for each of the luminaire modules, thereby allowing for outlining of the combined pattern prior to installation of the luminaire.

20. The assembly of claim 19, wherein the pattern comprises a closed loop pattern.

21. The assembly of claim 17, wherein the surface material is mountable to a support structure, and wherein each of said alignment modules are mountable to the support structure prior to installation of the surface material thereabove so to guide subsequent removal of surface material along said spacing.

22. The assembly of claim 21, wherein each of said alignment modules comprises opposed planar members disposable against the surface material, wherein said opposed edges are defined by respective opposed inner edges of said planar members laterally distanced from one another by one or more crosslinks so to define said substantially continuous spacing, and wherein said one or more crosslinks are removable once said alignment modules are mounted so to enable unobstructed guided removal of the surface material within said spacing along said inner edges.

23. The assembly of claim 17, wherein each of said alignment modules comprises one or more alignment structures defined at each end thereof for cooperative engagement with corresponding alignment structures of adjacently disposed modules to promote lengthwise and lateral alignment of said adjacently disposed edges.

24. A method for installing an assembly of luminaire modules recessed within a surface material in accordance with a designated assembly pattern, the method comprising:
mounting, for each of the luminaire modules, a corresponding template module comprising opposed inner edges spaced relative to one another so to at least accommodate a width of its corresponding luminaire module, wherein said inner edges of adjacently disposed template modules are aligned to define a substantially continuous spacing outlining the designated assembly pattern;
laying the surface material over said mounted template modules;
removing surface material within said spacing guided by said inner edges; and
installing the assembly of luminaire modules within said spacing in accordance with the designated assembly pattern.

25. The method of claim 24, wherein said inner edges are distanced by one or more cross members or links, the method further comprising, prior to laying the surface material, removing said one or more cross members or links so to subsequently enable unobstructed guided removal of the surface material within said spacing along said inner edges.

26. The method of claim 25, wherein at least one of said one or more cross members is disposed at an extremity of each said template module, said mounting comprising aligning each said template module end-to-end via corresponding alignment features integral to said at least one cross member, said removing thus further comprising removing said alignment features.

27. The method of claim 25, wherein the luminaire is to be installed recessed within a ceiling surface material, the method further comprising, before said mounting, assembling each said template module on a ground surface in alignment with and directly below a desired location of the luminaire installation; marking a location of each said template module on the ground surface via one or more template datums; and aligning said one or more template datums on the ceiling with corresponding markings on the ground surface using a laser projection.

28. A template for outlining disposition of a recessed component within a surface material, the template comprising:
- a template module disposable against the surface material and comprising opposed edges defining a substantially continuous spacing along said disposed edges, said spacing dimensioned so to accommodate a corresponding component dimension; and
- a cross-bridge fixed or fixable to said template module and extending across said spacing in maintaining said spacing during installation;
- wherein said opposed edges guide removal of surface material along said spacing to accommodate recessed installation of the closed-loop component within the surface material.

29. The template of claim 28, wherein said component comprises a closed-loop component, said edges defining a substantially continuous closed-loop spacing to accommodate said closed-loop component.

30. The template of claim 28, wherein said cross-bridge extends outside a plane defined by said opposed edges so to avoid interfering with a subsequent installation of the component recessed therebetween.

31. The template of claim 28, said template module comprising two or more template modules adjacently disposable end-to-end so to align said opposed edges with adjacently disposed edges in defining said substantially continuous spacing, at least one of said template modules comprising a corresponding cross-bridge.

* * * * *